United States Patent
Andersen et al.

(10) Patent No.: US 10,711,780 B2
(45) Date of Patent: Jul. 14, 2020

(54) HYDRAULIC MACHINE

(71) Applicant: Danfoss A/S, Nordborg (DK)

(72) Inventors: Stig Kildegaard Andersen, Krusaa (DK); Poul Erik Hansen, Aabenraa (DK); Erik Haugaard, Graasten (DK)

(73) Assignee: Danfoss A/S, Nordborg (DK)

( * ) Notice: Subject to any disclaimer, the term of this patent is extended or adjusted under 35 U.S.C. 154(b) by 256 days.

(21) Appl. No.: 15/187,982

(22) Filed: Jun. 21, 2016

(65) Prior Publication Data
US 2016/0377079 A1 Dec. 29, 2016

(30) Foreign Application Priority Data

Jun. 26, 2015 (EP) ..................... 15174081

(51) Int. Cl.
| | |
|---|---|
| *F04C 15/00* | (2006.01) |
| *F16J 1/09* | (2006.01) |
| *F04B 1/0448* | (2020.01) |
| *F04B 49/10* | (2006.01) |
| *F04B 53/14* | (2006.01) |

(Continued)

(52) U.S. Cl.
CPC ........ *F04C 15/0007* (2013.01); *F04B 1/0408* (2013.01); *F04B 1/0448* (2013.01); *F04B 1/124* (2013.01); *F04B 49/10* (2013.01); *F04B 53/00* (2013.01); *F04B 53/143* (2013.01); *F16J 1/09* (2013.01); *F16J 15/16* (2013.01);

(Continued)

(58) Field of Classification Search
CPC .. F16J 15/3408; F16J 15/3412; F16J 15/3416; F16J 15/3428; F16J 15/342; F16J 15/3424; F16J 15/3432; F16J 15/16; F04C 15/0007
See application file for complete search history.

(56) References Cited

U.S. PATENT DOCUMENTS

| | | | |
|---|---|---|---|
| 2,747,843 A | 5/1956 | Cox et al. | |
| 3,256,831 A | 6/1966 | Eickmann | |

(Continued)

FOREIGN PATENT DOCUMENTS

| | | |
|---|---|---|
| CN | 2729318 Y | 9/2005 |
| CN | 102072149 A | 5/2011 |

(Continued)

OTHER PUBLICATIONS

European Search Report for European Application No. EP 15174079 dated Jan. 12, 2016.

(Continued)

*Primary Examiner* — Kristina R Fulton
*Assistant Examiner* — L. Susmitha Koneru
(74) *Attorney, Agent, or Firm* — McCormick, Paulding & Huber PLLC

(57) ABSTRACT

A hydraulic machine is described having a first part (2) and a second part (3) moveable relative to said first part (3), one of said first part (2) and said second part (3) having a first land (9) resting against the other one of said second part (3) and said first part (2), having a predetermined first height (H1), and being arranged between a high pressure area (7) and a low pressure area (8). Such a machine should have a long working life. To this end a second land (10) having a predetermined second height (H2) smaller than said first height (H1) is located adjacent to said first land (9).

22 Claims, 1 Drawing Sheet

(51) Int. Cl.
*F04B 1/124* (2020.01)
*F04B 1/0408* (2020.01)
*F16J 15/16* (2006.01)
*F04B 53/00* (2006.01)
*F15B 13/08* (2006.01)
*F15B 15/14* (2006.01)
*F15B 15/12* (2006.01)

(52) U.S. Cl.
CPC ........... *F15B 13/0828* (2013.01); *F15B 15/12* (2013.01); *F15B 15/1452* (2013.01); *F15B 15/1461* (2013.01)

(56) References Cited

U.S. PATENT DOCUMENTS

| | | | |
|---|---|---|---|
| 3,507,584 A | 4/1970 | Robbins | |
| 3,582,241 A | 6/1971 | Niemiec et al. | |
| 3,926,095 A | 12/1975 | Weigle | |
| 3,947,046 A * | 3/1976 | Maruyama | F16J 9/20 277/443 |
| 5,180,173 A * | 1/1993 | Kimura | F16J 15/3412 277/400 |
| 5,496,047 A * | 3/1996 | Goldswain | F16J 15/3412 277/400 |
| 5,536,153 A | 7/1996 | Edwards | |
| 5,571,268 A * | 11/1996 | Azibert | F16J 15/3488 277/370 |
| 5,833,438 A | 11/1998 | Sundberg | |
| 5,944,498 A | 8/1999 | Wupper et al. | |
| 6,142,478 A * | 11/2000 | Pecht | F16J 15/3412 277/400 |
| 6,280,150 B1 | 8/2001 | Miyazawa | |
| 8,387,558 B2 | 3/2013 | Herre et al. | |
| 9,328,743 B2 | 5/2016 | Hirosawa et al. | |
| 9,546,671 B2 | 1/2017 | Hirosawa et al. | |
| 9,617,994 B2 | 4/2017 | Walters et al. | |
| 9,945,216 B2 | 4/2018 | Ghasripoor et al. | |
| 2003/0015840 A1 * | 1/2003 | Davis | F16J 15/004 277/320 |
| 2007/0108704 A1 * | 5/2007 | Craig | F16J 15/3468 277/370 |
| 2012/0043725 A1 * | 2/2012 | Jahn | F01D 11/00 277/306 |
| 2013/0108498 A1 | 5/2013 | Petersen et al. | |
| 2013/0108499 A1 | 5/2013 | Petersen et al. | |
| 2014/0234150 A1 | 8/2014 | Sugihara et al. | |
| 2015/0300352 A1 | 10/2015 | Walters et al. | |

FOREIGN PATENT DOCUMENTS

| | | |
|---|---|---|
| CN | 103075339 A | 5/2013 |
| CN | 103562568 A | 2/2014 |
| CN | 203532360 U | 4/2014 |
| CN | 203641136 U | 6/2014 |
| DE | 10 2005 056 909 A1 | 5/2007 |
| EP | 2 495 441 A1 | 9/2012 |
| EP | 2 662 565 A1 | 11/2013 |
| GB | 1 378 627 A | 12/1974 |
| GB | 2 032 010 A | 4/1980 |
| JP | S62-178781 A | 8/1987 |
| JP | 2006097497 A | 4/2006 |
| JP | 2010-190383 A | 9/2010 |
| WO | 2012/045995 A2 | 4/2012 |
| WO | 2014/003626 A1 | 1/2014 |

OTHER PUBLICATIONS

European Search Report for European Application No. EP15174081 dated Jan. 12, 2016.

* cited by examiner

HYDRAULIC MACHINE

CROSS REFERENCE TO RELATED APPLICATION

Applicant hereby claims foreign priority benefits under U.S.C. § 119 from European Patent Application No. 15174081 filed on Jun. 26, 2015, the content of which is incorporated by reference herein.

TECHNICAL FIELD

The present invention relates to a hydraulic machine having a first part and a second part moveable relative to said first part, one of said first part and said second part having a first land resting against the other one of said second part and said first part, having a predetermined first height, and being arranged between a high pressure area and a low pressure area.

BACKGROUND

The two parts can, for example, be in form of a port plate and a cylinder drum of an axial piston machine or in form of a side plate and a rotor of a vane type machine. Another possibility is a slide shoe or slipper of an axial piston pump sliding over a swashplate. The two parts together limit a pressure chamber the volume of which may vary during an operation cycle of the machine.

The two parts have to be pressed together with a certain force. This force must be big enough to ensure a tightness, i.e. to keep leakages as low as possible. On the other hand, this force must not be too high to avoid friction losses and wear. In most cases the force pressing the two parts together is at least partly generated by hydraulic pressures. These pressures must be balanced.

When during operation the first land is worn, for example by abrasive wear after a certain working life, the pressure balance is disturbed. In some cases there is the risk that the force pressing the two parts together increases. In this case the leakages decrease and the further wear increases dramatically so that a necessary maintenance of the machine becomes more complicated.

SUMMARY

The object underlying the invention is to have a long working life of the machine.

This object is solved with a hydraulic machine as described at the outset in that a second land having a predetermined second height smaller than said first height is located adjacent to said first land.

The front face of the first land resting against the other part forms a contact area. The pressure at the high pressure area side of the contact area corresponds to the high pressure of the high pressure area and the pressure at the low pressure area side of the contact area corresponds to the pressure in the low pressure area. The pressure decreases between the high pressure area and the low pressure area, in most cases it decreases linearly. When the first land is worn after a certain working life, the front faces of the first land and of the second land together form a contact area. This contact area is larger than the contact area formed by the first land alone. The pressure still decreases from the high pressure area to the low pressure area. However, this decrease takes place over a longer distance so that the force generated by the pressure acting on the combined contact area is larger than before. This leads to the effect that a force is generated tending to separate the first part and the second part from each other. This increases the leakage flow. The machine can still be operated, however, with a lower efficiency. Such an operation is an emergency operation having less wear.

In a preferred embodiment said first land and said second land are placed on the same part. In other words, the first land and the second land can be placed together on the first part or they can be placed together on the second part. This facilitates mounting of the two parts together.

Preferably said second land abuts against said first land. There is no gap between the second land and the first land in a direction from the high pressure area to the low pressure area so that there is no possibility for a hydraulic pressure to build up between the two lands.

In a preferred embodiment said first land and said second land are in one piece. There is only a step between the first land and the second land. This construction facilitates fabrication of the part carrying the two lands.

Preferably said second land is positioned on a low pressure side of said first land. The second land is positioned in the low pressure area so that it is effective only after the first land has been worn.

Preferably said first land and said second land are placed on the moving one of said first part and said second part.

In an alternative preferred embodiment said first land and said second land are placed on a stationary one of said first part and said second part. Both solutions are possible and show the same advantages.

It is also possible that said first part and said second part are placed on both parts.

In a preferred embodiment said second land has a height in a range of 30% to 70% of the height of said first land. The second land comes into effect when the first land has been worn to 30% to 70% of its initial height. This makes sure that the machine has a certain working life before a maintenance is necessary. On the other hand, a height of 30% of the initial height of the first land is sufficient to avoid greater damages.

Preferably said second land has a width in a range of 5% to 150% of the width of said first land. The width of the two lands is the direction from the high pressure area to the low pressure area. When the second land comes into effect, the width of the contact area is increased by a factor 1.05 to 2.5.

Preferably the width of the land increases gradually when the height of the land is reduced by wear. This means in other words that the second land comprises at least an inclined surface rising in a direction to said first land.

Preferably said machine comprises a leakage flow detector. As mentioned above, with the two lands the leakage flow increases in case of a failure. Such an increase of leakage flow can be detected by the leakage flow detector. The leakage flow detector can, for example, be a flow meter. In case of an abnormal increase of the leakage flow a signal can be produced indicating that a maintenance is necessary.

BRIEF DESCRIPTION OF THE DRAWINGS

Preferred examples of the invention will now be described in more detail with reference to the drawing, wherein.

DETAILED DESCRIPTION

Figure 1:
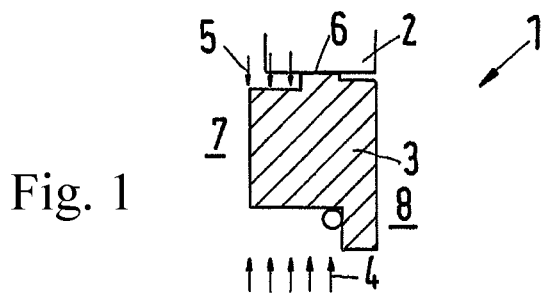
FIG. 1 is a schematic view of parts of a hydraulic machine.

FIG. 1 schematically shows a hydraulic machine 1 having a first part 2 and a second part 3. The second part 3 is moveable relative to the first part 2. The second part 3 can, for example, be rotated relative to the first part 2 or slide over the first part 2.

The second part 3 has to be pressed with a certain force against the first part 2. At least part of the necessary force is generated by means of a hydraulic pressure symbolized by arrows 4 acting on the second part 3 in a direction towards the first part 2. The hydraulic pressure acts also in the opposite direction which is symbolized by arrows 5. However, since the hydraulic pressure acting in a direction towards the first part 2 acts on a larger pressure area than the hydraulic pressure in the opposite direction, a force is generated pressing the second part 3 against the first part 2.

A contact area 6 is located between a high pressure area 7 and a low pressure area 8. This contact area basically seals the low pressure area 8 from the high pressure area 7. However, a minor leakage flow can be observed crossing the contact area.

Figure 2A:
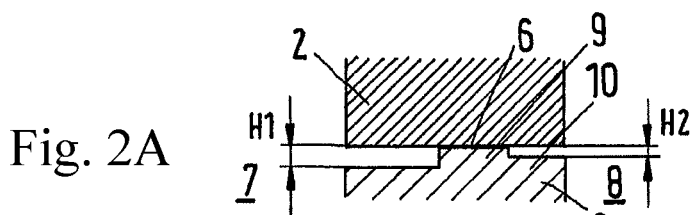
FIG. 2A shows a first embodiment of the invention.

As shown in FIG. 2a, the contact area 6 is formed at a front face of a first land 9. In a new or unfaulty case the first land 9 has a height H1 with which it protrudes from the second part 3 towards the first part 2.

On the side of the low pressure area 8 there is a second land 10 having a height H2 with which it protrudes from the second part 3 in a direction towards the first part 2. The height H2 of the second land 10 is smaller than the height H1 of the first land 9.

The first land 9 and the second land 10 are both positioned on the second part 3. The second land 10 abuts against the first land 9 so that there is no gap between the second land 10 and the first land 9. In a simple construction the second land 10 and the first land 9 are formed in one piece and are formed in one piece with the second part 3.

Figure 2B:
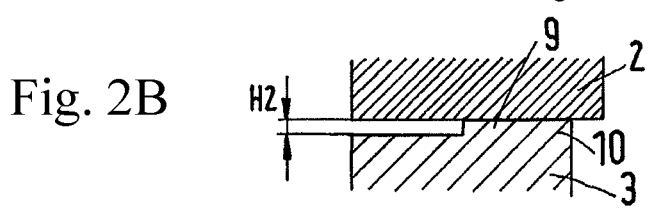
FIG. 2B shows the embodiment shown in FIG. 2A, in the situation that the first land is worn.
Figure 2C:
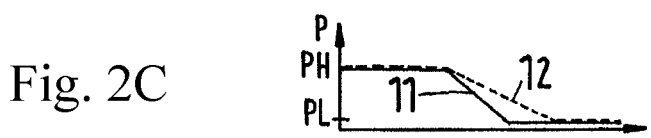
FIG. 2C shows a curve showing the pressure.

FIG. 2c shows a curve 11 in full line showing the pressure P. In the high pressure area 7 there is a high pressure PH and in the low pressure area 8 there is a low pressure PL. In the contact area 6 the pressure decreases from PH to PL.

FIG. 2b shows the situation in which the first land 9 is worn, i.e. it has been grinded to have the same height as the second land 10, i.e. the height H2.

FIG. 2c shows another curve 12 with a dotted line. Again, in the high pressure area 7 the pressure P is the high pressure PH and in the low pressure area 8 the pressure P is the low pressure PL. The front faces of the two lands 9, 10 together now form an increased contact area so that the pressure decrease from PH to PL takes place over a greater width. The consequence is that the forces tending to move the second part 3 away from the first part 2 are increased. This in turn has the effect that a leakage flow from the high pressure area 7 to the low pressure area 8 is increased. Such an increase in the leakage flow can be detected by a leakage flow detector (not shown), for example a leakage flow meter.

The machine can still run when the first land 9 is worn as shown in FIG. 2b. However, such an operation is an emergency operation because the machine has a lower efficiency. Nevertheless, due to the higher leakage flow and less contact pressure a further wear of the machine is reduced.

In the embodiment shown in FIG. 2, the first part 2 can be, for example, a side plate of a vane type machine and the second part 3 can be a rotor of this machine. In this case the second part 3 is the moving part.

FIG. 3 shows another embodiment of the invention. The same elements as in FIGS. 1 and 2 are referred to with the same reference numerals.

In this case the second part 3 can be, for example, a port plate having a kidney-shaped opening 13 forming the high pressure area 7.

Again, the second part 3 which is the stationary part now shows a first land 9 abutting against the first part 2. The first land 9 has a height H1. A second part 10 adjacent the first land 9 shows a height H2 which is smaller than the first height H1 of the first land. A curve 11 in FIG. 3d shows the pressure which is a high pressure PH in the opening 13, i.e. in the high pressure area 7, and which is a low pressure PL in the low pressure area 8. Across the first land 9 there is a decrease in pressure from high pressure PH to low pressure PL.

Figure 3A:
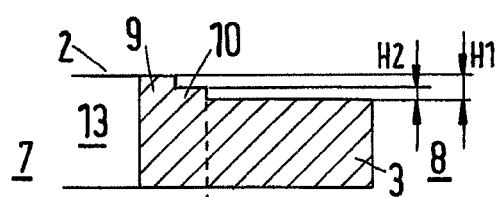
FIG. 3A shows another embodiment of the invention.
Figure 3B:
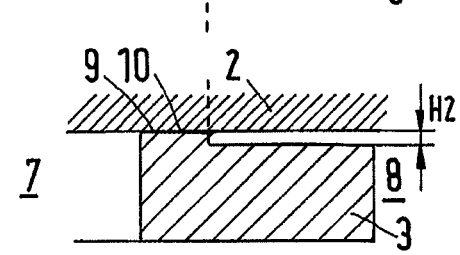
FIG. 3B shows the embodiment shown in FIG. 3A, in the situation that the first land is worn.

FIG. 3b shows the situation in which the first land 9 has been worn so that it has the same height H2 as the second land 10. The first land 9 and the second land 10 together now form a contact area between the second part 3 and the first part 2. The pressure P decreases from high pressure PH to low pressure PL as shown with a dotted line curve 12 in FIG. 3d. However, this decrease takes place over a longer distance so that the forces generated by the hydraulic pressure between the two lands 9, 10 and the first part 2 generate higher forces tending to separate the second part 3 from the first part 2.

Figure 3C:
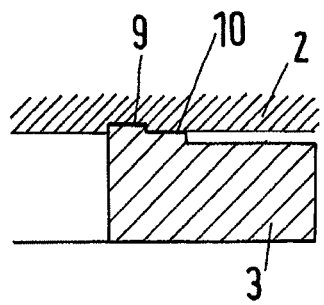
FIG. 3C shows the embodiment shown in FIG. 3A, in the situation that the first land has been worked into the first part of the hydraulic machine.
Figure 3D:
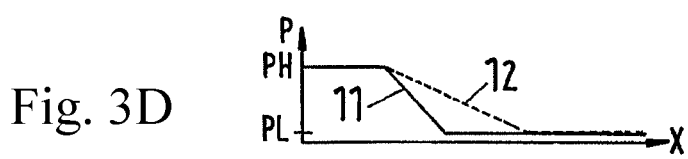
FIG. 3D shows a curve showing the pressure.

As shown in FIG. 3c the second land 10 can be effective also when the first land 9 has not be worn but has been worked into the first part 2. When the second land 10 contacts the first part 2 the combined contact area between the first part 2 and the second part 3 is increased so that the pressure has a similar function as shown in FIG. 3d.

The second height H2 of the second land 10 is in a range of 30% to 70% of the first height H1 of the first land 9.

Furthermore, the second land 9 has a width in a range of 5% to 150% of the width of the first land 9. The width is the direction from the high pressure area 7 to the low pressure area 8.

The second land can have an inclined surface rising in a direction towards the first land. When the first land is grinded by wear so that the other of the two parts comes into contact with the second land, the width of the combined land increases gradually when the height of the land is reduced by wear.

The invention can also be used in connection with an axial piston machine in which slide shoes are moved relative to a swash plate. In this case the slide shoes can bear additionally the above mentioned second land 10 adjacent the first land 9.

The idea could be used in other places in a hydraulic machine, for example in a valve plate, side plate, etc. of an axial piston machine, a vane cell machine or the like. The idea could also be used in other hydraulic machines, for example a pressure exchanger.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic machine having a first part and a second part movable relative to said first part, one of said first part and said second part having a first land resting against the other one of said second part and said first part during operation, having a predetermined first height (H1), and being arranged between a high pressure area and a low pressure area, wherein a second land having a predetermined second height (H2) smaller than said first height (H1) is located adjacent to said first land, wherein said second part has a first surface with a first pressure area and a second surface with a second pressure area, wherein said first pressure area is greater than said second pressure area, wherein when hydraulic pressure is fluidly connected with said first surface and said second surface, the hydraulic pressure presses said second part towards said first part, and wherein said second land is positioned on a low pressure side of said first land.

2. The hydraulic machine according to claim 1, wherein said first land and said second land are placed on the same part.

3. The hydraulic machine according to claim 1, wherein said second land abuts against said first land.

4. The hydraulic machine according to claim 1, wherein said first land and said second land are in one piece.

5. The hydraulic machine according to claim 1, wherein said first land and said second land are placed on a moving one of said first part or said second part.

6. The hydraulic machine according to claim 1, wherein said first land and said second land are placed on a stationary one of said first part and said second part.

7. The hydraulic machine according to claim 1, wherein said second land has the second height (H2) in a range of 30% to 70% of the first height (H1) of said first land.

8. The hydraulic machine according to claim 1, wherein said second land has a width in a range of 5% to 150% of the width of said first land.

9. The hydraulic machine according to claim 1, wherein a width of the first land increases gradually when the height of the first land is reduced by wear.

10. The hydraulic machine according to claim 1, wherein said machine comprises a leakage flow detector.

11. The hydraulic machine according to claim 2, wherein said second land abuts against said first land.

12. The hydraulic machine according to claim 2, wherein said first land and said second land are in one piece.

13. The hydraulic machine according to claim 3, wherein said first land and said second land are in one piece.

14. The hydraulic machine according to claim 2, wherein said first land and said second land are placed on a moving one of said first part and said second part.

15. The hydraulic machine according to claim 3, wherein said first land and said second land are placed on a moving one of said first part and said second part.

16. A hydraulic machine comprising:
a first part;
a second part movable relative to the first part;
wherein the first part includes a first land having a first height;
wherein the first land is arranged between a high pressure area and a low pressure area;
wherein the first part includes a second land located adjacent to the first land, the second land having a second height;
wherein the first land is in contact with the second part while the second part moves relative to the first part;
wherein the second part has a first surface with a first pressure area and a second surface with a second pressure area;
wherein the first pressure area is greater than the second pressure area;
wherein when hydraulic pressure is fluidly connected with the first surface and the second surface, the hydraulic pressure presses said second part towards said first part; and
wherein said second land is positioned on a low pressure side of said first land.

17. A hydraulic machine comprising:
a first part;
a second part movable relative to the first part;
wherein the second part includes a first land having a first height;
wherein the first land is arranged between a high pressure area and a low pressure area;
wherein the second part includes a second land located adjacent to the first land, the second land having a second height;
wherein the first land is in contact with the first part while the second part moves relative to the first part;
wherein the second part has a first surface with a first pressure area and a second surface with a second pressure area;
wherein the first pressure area is greater than the second pressure area;
wherein when hydraulic pressure is fluidly connected with the first surface and the second surface, the hydraulic pressure presses the second part towards the first part; and
wherein said second land is positioned on a low pressure side of said first land.

18. The hydraulic machine according to claim 1, wherein during operation said first land is always resting against said second part, if said first part has said first land, or against said first part, if said second part has said first land.

19. The hydraulic machine according to claim 1, wherein said first part is pressed against said second part with a force.

20. The hydraulic machine according to claim 1, further comprising a leakage flow detector configured to detect an increase in a leakage flow of fluid between said first part and said second part.

21. The hydraulic machine according to claim 16, wherein a width of the first land increases gradually when the height of the first land is reduced by wear.

22. The hydraulic machine according to claim 17, wherein a width of the first land increases gradually when the height of the first land is reduced by wear.

\* \* \* \* \*